| United States Patent [19] | [11] | 4,244,937 |
|---|---|---|
| Durkin | [45] | Jan. 13, 1981 |

[54] SULFUR DIOXIDE OXIDATION CATALYST AND PROCESS

[75] Inventor: Joseph A. Durkin, Groves, Tex.

[73] Assignee: Texaco Inc., White Plains, N.Y.

[21] Appl. No.: 61,734

[22] Filed: Jul. 30, 1979

[51] Int. Cl.$^3$ .............................................. C01B 17/74
[52] U.S. Cl. ................................... 423/522; 423/533; 423/244
[58] Field of Search ............... 423/522, 533, 534, 535, 423/538, 244 R

[56] References Cited

U.S. PATENT DOCUMENTS

| Re. 18,380 | 3/1932 | Jaeger | 423/534 |
| 1,675,309 | 6/1928 | Jaeger | 423/533 |
| 1,845,413 | 2/1932 | Hechenbleikner | 423/522 |
| 1,900,751 | 3/1933 | Baehr | 423/533 |

*Primary Examiner*—O. R. Vertiz
*Assistant Examiner*—Gary P. Straub
*Attorney, Agent, or Firm*—Carl G. Ries; Robert A. Kulason; Robert Knox, Jr.

[57] ABSTRACT

A catalytic process for the oxidation of sulfur-containing gases, e.g., sulfur dioxide and simultaneous production of sulfuric acid wherein a sulfur-containing gas is reacted with an oxygen-containing gas in the presence of a catalyst comprising an iron group metal on a solid support comprising a zeolite in a silica-alumina matrix.

9 Claims, No Drawings

SULFUR DIOXIDE OXIDATION CATALYST AND PROCESS

This invention relates to a novel process and catalyst for the oxidation of sulfur-containing gases, e.g., sulfur dioxide. In one of its more specific aspects, this invention relates to a novel process for the production of sulfuric acid from sulfur-containing gases by reaction with an oxygen-containing gas, optionally with added water vapor, in the presence of a composite solid contact catalyst comprising an iron group metal or compound on a base containing one or more of the oxides, silica, alumina, magnesia, zirconia, and beryllia. A preferred catalyst composition comprises nickel and tungsten on a support comprising a zeolite in a silica-alumina matrix.

The process and catalyst of this invention are useful for the treatment of stack gases and other gases containing sulfur dioxide. Sulfuric acid is a useful product obtained by reacting sulfur dioxide, water vapor, and oxygen contained in typical stack gases in the presence of the catalyst of this invention. The process of this invention serves as a method for removing gaseous sulfur compounds from various industrial waste gases to reduce or prevent pollution of the environment.

The type catalyst employed in the process of the present invention is one which has been used for hydrocracking, a well known petroleum refining process. Hydrocracking catalysts generally are bi-functional and contain two components, a hydrogenating component and a cracking component. Cracking catalysts contain active acid sites, for example silica, alumina or composites thereof, often promoted with a halogen. Accordingly, supports for hydrocracking catalysts are usually acidic to promote the cracking portion of the hydrocracking reaction. The active hydrogenating component is distributed on the acidic support.

A preferred catalyst for the process of the present invention contains two primary components, an iron group metal component and a solid, porous support comprising a hydrogen zeolite and a silica-alumina matrix. Suitable components comprise metals and compounds of metals of the iron group of the Periodic Table, particularly cobalt and nickel. Advantageously, the catalyst may also contain a Group VI metal, e.g., molybdenum, or tungsten, in conjunction with the iron group metal. The metal component may be either in metallic form or in the form of a compound, e.g., the oxide, sulfide, or telluride of the metal. A catalyst of this type and its method of preparation are described in detail in U.S. Pat. No. 3,816,297.

The base component of the catalyst preferably comprises a crystalline zeolite and at least one amorphous inorganic oxide, the zeolite being present in an amount between about 10 and 60 percent by weight. Suitable amorphous inorganic oxides are those having active acid sites, such as silica, alumina, magnesia, zirconia, and beryllia, optionally treated with an acidic agent, such as hydrofluoric acid, to increase acid active sites. A preferred mixture of amorphous inorganic oxides comprises silica and alumina in proportions ranging from 60 to 90 weight percent silica and 10 to 40 weight percent alumina.

The zeolite portion of the base component, when present, preferably has uniform pore openings of from 6 to 16 Angstrom units, and a silica-alumina ratio of at least 2.5, e.g., 3 to 10. The hydrogen form of the zeolite is prefered and may be prepared by subjecting a natural or synthetic zeolite containing alkali metal ions to ion exchange by contact with an aqueous solution of an ammonium compound at a temperature in the range of about 38° C. to 120° C. (about 100° to 250° F.) until the ion exchange appears substantially complete, for example, 8 to 24 hours. The ion exchange zeolite is then washed to remove soluble alkali metal compounds, e.g., the hydroxide, and dried at a temperature sufficiently high to drive off ammonia. The zeolite is then in the hydrogen form and typically has an alkali metal content of about 2 to 4 weight percent. An alternating sequence of ion exchange and calcination may be repeated one or more times as disclosed in U.S. Pat. No. 3,816,297, the disclosure of which is incorporated herein by reference. The final calcination temperature should not exceed 650° C. (about 1200° F.).

The iron group metal may be present in an amount between about 5 and 10 weight percent, and the Group VI metal may be present in an amount preferably between about 5 and 30 weight percent of the final catalyst composition. Particularly suitable catalysts are those which contain between 5 and 10 percent by weight iron group metal and between 15 and 30 weight percent Group VI metal. A specific example of a suitable catalyst is one containing about 6 to 7 percent nickel and about 20 percent tungsten on a support made up of about 20 percent zeolite, 58 percent silica, and 22 percent alumina, all percentages by weight.

The catalyst preferably is presulfided by methods well known in the art, such as by subjecting the catalyst at a temperature in the range of about 200° to 370° C. (400° to 700° F.) to contact with a sulfiding agent, for example, hydrogen containing 10 to 20 percent hydrogen sulfide or carbon disulfide, or it may be used without a presulfiding treatment.

Although the catalyst compositions described herein and utilized for the oxidation of sulfide dioxide and other sulfur-containing gases in accordance with the process of this invention are known, per se, in the art of hydrocracking heavy petroleum distillates and residua, I am not aware of any prior art concerning the use of these compositions for the oxidation of sulfur dioxide or other sulfur-containing gases or for the conversion of sulfur dioxide in the presence of an oxygen-containing gas and water vapor to sulfuric acid.

In accordance with the process of this invention, a mixture of a gaseous sulfur compound, water vapor, and a gas containing uncombined or free oxygen are passed over a catalyst comprising an iron group metal and a Group VI metal in oxide or sulfide form, e.g., nickel and tungsten sulfides, on a hydrogen zeolite-amorphous inorganic oxide support, e.g., silica-alumina at a temperature within the range of 150° to 600° C., effecting oxidation of the sulfur compound and the production of sulfuric acid. The process may be carried out at substantially atmospheric pressure or at a higher or lower pressure.

The mixture of gases undergoing treatment may comprise flue gases, which normally contain sufficient oxygen and water vapor for conversion of the sulfur dioxide in the flue gas to sulfuric acid, or other industrial gases. The process is applicable to the treatment of various waste or by-product gases containing gaseous sulfur compounds, including gases resulting from smelting or roasting sulfide ores, gases produced by the oxidation of paper mill wastes, and various gases containing carbonyl sulfide and hydrogen sulfide, such as those obtained in the treatment of sour water or in purification of natural gas, and in various petroleum refinery operations.

The process is carried out at a temperature in the range of 150° to 600° C., preferably 200° to 425° C., and at a pressure in the range of 3.5 to 350 kPa, preferably about 100 kPa. When the gaseous sulfur compound is sulfur dioxide and the oxygen-containing gas is air, the volumetric ratio of sulfur dioxide to air is maintained within the range of 0.01 to 10, preferable within the range of 0.1 to 5. The total pressure under which the process is operated is suitably within the range of 3.5 to 345 kPa (0.5 to 50 psia), preferably about 100 to 105 kPa (essentially atmospheric pressure). The amount of water vapor supplied to the reactor is preferably within the range of 0.5 to 5 volumes per volume of sulfur dioxide.

EXAMPLE 350 grams of a nickel-tungsten zeolite-matrix catalyst comprising 6.5 weight percent nickel, 20 weight percent tungsten, 20 weight percent hydrogen zeolite Y, 58 percent silica, and 22 percent alumina in the form of pellets 4 mm in diameter were charged to a Vycor glass tube 5 cm in diameter by 86 cm in length. The tube was then mounted in a vertical tube furnace and the catalyst purged with dry air while raising the catalyst temperature of 540° C. (1000° F.). The dry air feed rate was maintained at 39.6 liers per hour (1.4 cubic feet per hour). Sulfur dioxide was introduced into the air stream at the rate of 3.96 liters per hour (0.14 cubic feet per hour) and sufficient water vapor was added to the dry air to saturate the air at 25° C. Water was consumed at the rate of approximately 1.1 grams per hour. At the end of 24 hours, approximately 42 ml of 29.5 Normal sulfuric acid solution was produced and recovered as condensate from the effluent from the catalytic reactor. Uncondensed gaseous effluent was scrubbed with a 10 percent aqueous caustic (sodium hydroxide) solution and sulfur-free gases discharged to the atmosphere.

It is evident from the example that the process of this invention provides a means for converting gaseous sulfur compounds contained in waste gases into a commercially valuable product and, at the same time, cleaning up the waste gases to prevent atmospheric pollution.

We claim:

1. A process for the conversion of gaseous sulfur compounds to sulfuric acid which comprises passing a mixture of a gaseous sulfur compound and an oxygen-containing gas into contact with a catalyst at a temperature in the range of 150° to 600° C. and a pressure in the range of 3.5 to 350 kPa in the presence of water vapor, said catalyst comprising 5 to 10 weight percent nickel and 15 to 30 weight percent tungsten based on the total weight of the catalyst composite said nickel and tungsten being added to the catalyst by impregnation of nickel and tungsten compounds onto a base comprising 40–90 weight percent amorphous oxide having active acid sites selected from the group consisting of silica, alumina, zirconia, magnesia and beryllia and mixtures and composites of said oxides with one another and 10 to 60 weight percent of a hydrogen crystalline zeolite.

2. The process of claim 1 in which the hydrogen zeolite is a zeolite Y prepared by subjecting zeolite Y containing alkali metal ions to ion exchange with an aqueous solution of an ammonium compound until the ion exchange appears substantially complete, washing the ion exchanged zeolite to remove soluble alkali metal compounds and then drying at a temperature sufficiently high to drive off ammonia.

3. A process according to claim 1 wherein said mixture is passed into contact with said catalyst at a rate within the range of 1 to 500 volumes of said mixture per volume of catalyst per hour.

4. The process of claim 1 wherein the mixture of sulfur dioxide, water vapor, and uncombined oxygen comprises flue gas.

5. A process as defined in claim 1 wherein said gaseous sulfur compound comprises hydrogen sulfide.

6. A process as defined in claim 1 wherein said gaseous sulfur compound comprises sulfur dioxide.

7. A process according to claim 6 wherein said mixture contains 1 to 10 moles oxygen per mole of sulfur dioxide.

8. A process according to claim 7 wherein said mixture contains 0.5 to 5 volumes water vapor per volume of sulfur dioxide.

9. A process according to either of claim 6 or 8 wherein said base comprises from about 10 to about 60 weight percent of a hydrogen zeolite Y with the balance of said base composed of a mixture of from about 60 to about 90 weight percent silica and from about 40 to about 10 weight percent alumina.

* * * * *